US006763871B2

(12) United States Patent
Hilbert, Sr. et al.

(10) Patent No.: US 6,763,871 B2
(45) Date of Patent: Jul. 20, 2004

(54) SLIP CUTTING SYSTEM

(75) Inventors: Thomas F. Hilbert, Sr., Fond du Lac, WI (US); Thomas F. Hilbert, Jr., Fond du Lac, WI (US); Dale E. Lanser, Elkhart Lake, WI (US)

(73) Assignee: Converting Biophile Laboratories, Inc., Fond du Lac, WI (US)

( * ) Notice: Subject to any disclaimer, the term of this patent is extended or adjusted under 35 U.S.C. 154(b) by 364 days.

(21) Appl. No.: 09/875,525

(22) Filed: Jun. 8, 2001

(65) Prior Publication Data

US 2002/0185217 A1 Dec. 12, 2002

(51) Int. Cl.[7] ........................ B32B 31/18; B32B 35/00; B26D 5/20; B26D 7/20

(52) U.S. Cl. ........................ 156/510; 156/582; 83/218; 83/222; 83/227; 83/260; 83/261; 83/436.5; 83/436.7; 83/659

(58) Field of Search ................................ 156/250, 256, 156/263, 269, 510, 516, 517, 519, 520, 534, 538, 581, 582; 83/38, 39, 284, 310, 313, 436.3, 436.5, 436.6, 436.7, 658, 659, 673, 674, 218, 222, 225–227, 230, 259, 260, 261, FOR 101

(56) References Cited

U.S. PATENT DOCUMENTS 3,955,577 A * 5/1976 Gellert et al. ............... 604/366
4,226,150 A * 10/1980 Reed ........................... 83/346
4,337,058 A * 6/1982 Lerner ......................... 493/11
4,779,781 A * 10/1988 Billberg et al. ................ 226/2
6,062,285 A * 5/2000 Dotta et al. ................. 156/512
6,244,148 B1 * 6/2001 Vees ........................... 83/348
6,524,423 B1 * 2/2003 Hilt et al. .................. 156/265

* cited by examiner

*Primary Examiner*—Richard Crispino
*Assistant Examiner*—Sing P Chan
(74) *Attorney, Agent, or Firm*—Donald Cayen

(57) ABSTRACT

A slip cutting system sheets an infeed web into discrete articles and merges the articles to a carrier web. The slip cutting system comprises a continuously rotating cutting die having knife blades and packings consecutively around a peripheral surface. The packings cooperate with the knife blades to define a circumferential space between each packing and an associated knife blade. When a packing is at a nip with an anvil roller, the infeed web is drawn in a downstream direction. When a circumferential space is at the nip, the infeed web halts downstream motion. When a knife blade is at the nip, the knife blade sheets the infeed web. An insert station cooperates with the cutting die to longitudinally space the articles as they merge to and are propelled downstream by the carrier web. At a subsequent station, the composite web is cut to manufacture individual products.

14 Claims, 5 Drawing Sheets

FIG. 5
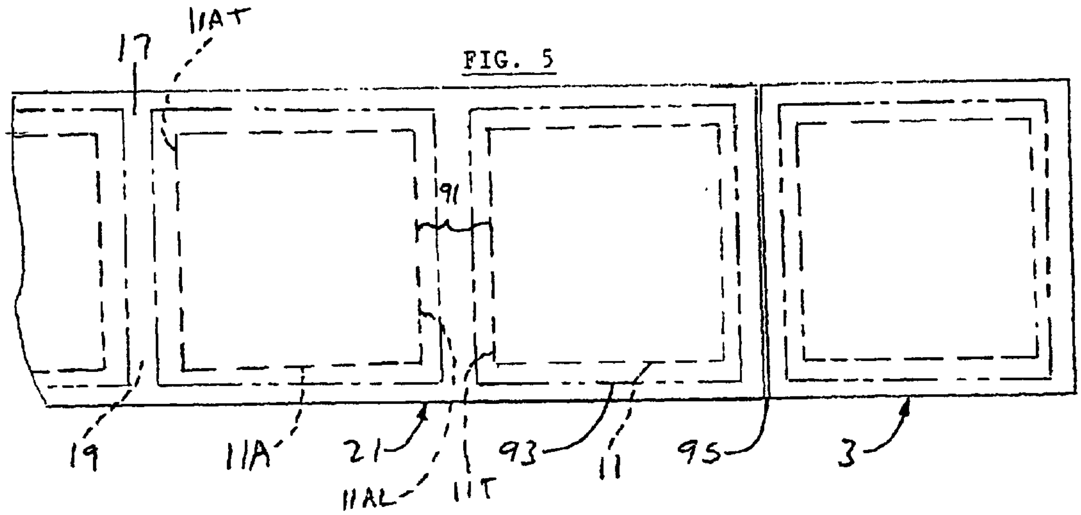
FIG. 4
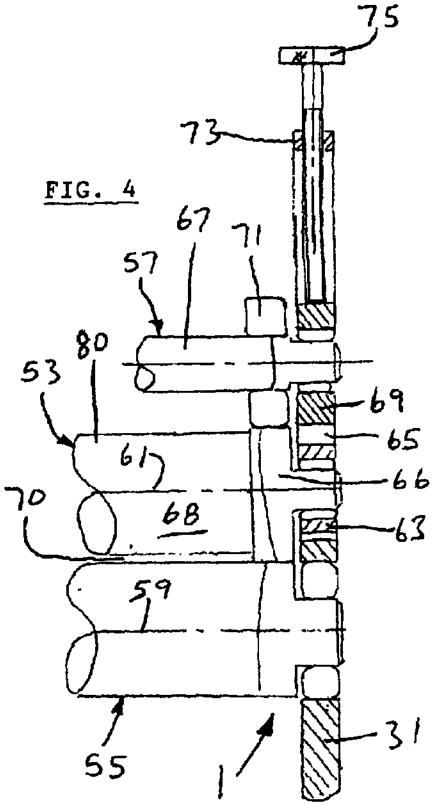
FIG. 3
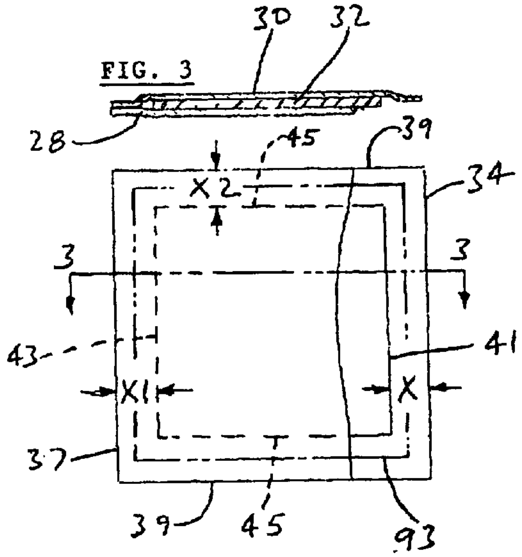
FIG. 2

SLIP CUTTING SYSTEM

BACKGROUND OF THE INVENTION

1. Field of the Invention

This invention pertains to processing multiple moving webs, and more particularly to apparatus that sheets a first web into discrete articles and merges the articles with a carrier web.

2. Description of the Prior Art

Numerous products are manufactured from one or more moving webs of flexible materials. To manufacture such products, various types of equipment have been developed to handle the webs. For example, many prior machines overlay two or more webs, which are often laminated to each other. The composite web is usually cut into individual products. U.S. Pat. Nos. 5,803,888 and 6,030,329 are representative of such prior web handling equipment.

It is also well known to capture discrete articles between two webs and to seal the webs to each other around the articles. The webs are then cut to make individual products consisting of the article and the surrounding web material. Examples of prior machines and the products produced by them may be seen in U.S. Pat. Nos. 4,244,158; 4,369,613; 4,601,157; 4,864,802; 5,044,145; 5,357,731; 5,628,165; 5,875,614; and 6,115,999.

In the nine aforementioned patents, the respective articles to be packaged are supplied to the machinery as discrete rigid objects. Suitable mechanisms space the articles at the required distances as they approach the webs and are captured between them.

U.S. Pat. No. 6,018,092 describes a flexible medical product that has an adhesive bandage between two sheets. The adhesive bandage is spaced from the sheets edges, but no description is given as to how the placement of the adhesive bandage on the sheets is accomplished.

The prior equipment for manufacturing individual products works well for their intended uses. Nevertheless, the prior equipment is subject to further refinements.

SUMMARY OF THE INVENTION

In accordance with the present invention, a slip cutting system is provided that sheets an infeed web of flexible material into discrete articles and then merges the articles to a carrier web. This is accomplished by apparatus that includes a rotary cutting die having at least one knife blade and at least one friction packing. The slip cutting system may be part of a machine that also cuts the carrier web to manufacture individual products.

The cutting die cooperates with an anvil roller of constant working diameter to form a nip that defines a nip plane. The anvil roller is mounted for rotation at its opposite ends at a fixed location in the machine frame. The cutting die is journaled at its opposite ends in die blocks. The cutting die is generally cylindrical in shape, having a longitudinal axis and a peripheral surface between two cylindrical rails. Protruding above the peripheral surface between the rails is the knife blade, which is parallel to the longitudinal axis. The packing is made from any material that is compatible with the infeed web. The packing is relatively thin, and it is bonded to the cutting die peripheral surface. A leading edge of the packing is adjacent the knife blade. A trailing edge of the packing is spaced circumferentially from the knife blade. If there is more than one knife blade, there is a packing in association with each knife blade. The leading edge of each packing is adjacent a knife blade. The trailing edge of each packing is spaced from the next consecutive knife blade.

The cutting die blocks are retained for sliding in slots in the machine frame such that the center distance between the cutting die and the anvil roller is variable. At a minimum center distance, the anvil roller contacts the cutting die rails.

There is a force mechanism in operative association with the cutting die. According to one aspect of the invention, the force mechanism comprises bearing blocks that are retained for sliding in the same slots as the die blocks. The bearing blocks rotatably support opposite ends of a bearing bar. A set of bearings held on the bearing bar contact the cutting die rails diametrically opposite the anvil roller. A pressure plate is fixed to the machine frame over each slot. A long screw threads through each pressure plate and bears against the associated bearing block. Turning the screws forces the bearing bar bearings against the cutting die rails.

Upstream of the cutting die and anvil roller is an infeed bar that lies across the path of the infeed web. The infeed web is guided into the nip between the cutting die and the anvil roller by the infeed bar. By varying the infeed bar position, the angle at which the infeed web enters the nip can be varied to suit the particular infeed web.

The infeed web is supplied from a roll upstream of the infeed bar. Between the infeed web supply roll and the infeed bar is a drag station. At the drag station, a drag force is imparted to the infeed web that resists downstream motion of the infeed web toward the slip cutting system.

According to one embodiment of the invention, the carrier web consists of top and bottom webs, and the slip cutting system includes an insert station at which the articles are inserted and captured between the top and bottom webs. The insert station is comprised of three guide rods that are parallel to the cutting die longitudinal axis. First and second guide rods are close to the downstream side of the nip. The first and second guide rods are located approximately equidistantly on opposite sides of the nip plane. The third guide rod is located downstream of the first and second guide rods. The top edge of the third guide rod is on the same side of the nip plane as the first guide rod. In machines in which the cutting die is vertically above the anvil roller, the nip plane is horizontal. In that situation, the top edge of the third guide rod is above the nip plane.

The top web is guided around the first guide rod and then passes over the third guide rod. The bottom web is guided around the second guide rod and passes over the third guide rod, between the third guide rod and the top web. Consequently, a triangular shaped space is present between the top and bottom webs, with the space apex being at the third guide rod.

Downstream of the slip cutting system is a drive station. The drive station pulls the top and bottom webs continuously downstream.

In operation, the force mechanism screws are turned to apply a measured amount of force between the bearing bar bearings and the cutting die rails. The same force is applied between the cutting die rails and the anvil roller. The drive station continuously pulls the top and bottom sheets from their respective supply rolls through the insert station. Simultaneously, the cutting die rotates continuously at the same surface speed as the webs speed. The infeed web is drawn into the nip between a cutting die packing and the anvil roller. Friction between the cutting die packing and the infeed web draws the infeed web through the nip, against the drag force imparted to the infeed web at the drag station, for a part of a revolution of the cutting die and anvil roller.

When the trailing edge of the packing has passed the nip, the circumferential space between the packing trailing edge and the knife blade reaches the nip. The previously existing friction force between the packing and the infeed web disappears. That friction force is replaced by a much smaller friction force of the cutting die peripheral surface on the infeed web. The smaller friction force is not sufficient to draw the infeed web against the drag force. Consequently, the infeed web halts its downstream motion. As the cutting die continues to rotate, the knife blade approaches and then sheets the stationary infeed web at the nip with the anvil roller to make a discrete article from the infeed web. Almost instantly, the leading edge of the packing adjacent the knife blade comes into contact with the new leading end of the infeed web at the nip and reestablishes the friction force between the infeed web and the cutting die packing. The infeed web is again drawn through the nip. At the same time, the knife blade pushes the trailing edge of the sheeted article downstream to the insert station. The article enters the triangular space between the top and bottom webs, and it is captured between them. Friction of the two webs on the article propels the three-component composite web in the downstream direction for further processing.

The constantly rotating cutting die draws the infeed web until the packing trailing edge is again at the nip. The infeed web again halts downstream motion while the cutting die circumferential space passes over the infeed web. While the infeed web downstream motion is halted, the continuously moving top and bottom webs continue to propel the previously sheeted article in the downstream direction. The knife blade eventually reaches the nip and again sheets the infeed web and pushes the newly sheeted article downstream. However, the leading edge of the newly sheeted article is spaced from the trailing edge of the previously sheeted article a distance determined by the circumferential space between the packing trailing edge and the knife blade. Accordingly, the sheeted articles are at longitudinally spaced intervals between the top and bottom webs of the composite web. The composite web may be sealed and cut into individual products downstream of the insert station.

The method and apparatus of the invention, using an intermittently applied friction force between an infeed web and a cutting die, thus sheets the infeed web into discrete articles and merges the articles to a carrier web. The articles are spaced apart longitudinally along the carrier web, even though the cutting die continuously rotates at a constant speed.

Other advantages, benefits, and features of the present invention will become apparent to those skilled in the art upon reading the detailed description of the invention.

BRIEF DESCRIPTION OF THE DRAWINGS

FIG. 2 is a broken front view of a typical product that is manufactured on the processing machine of FIG. 1.

FIG. 3 is a cross-sectional view taken along line 3—3 of FIG. 2.

FIG. 4 is a cross-sectional view of the stacking of a die station taken along line 4—4 of FIG. 1.

FIG. 5 is a top view of a composite web according to the present invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

General

Figure 1:
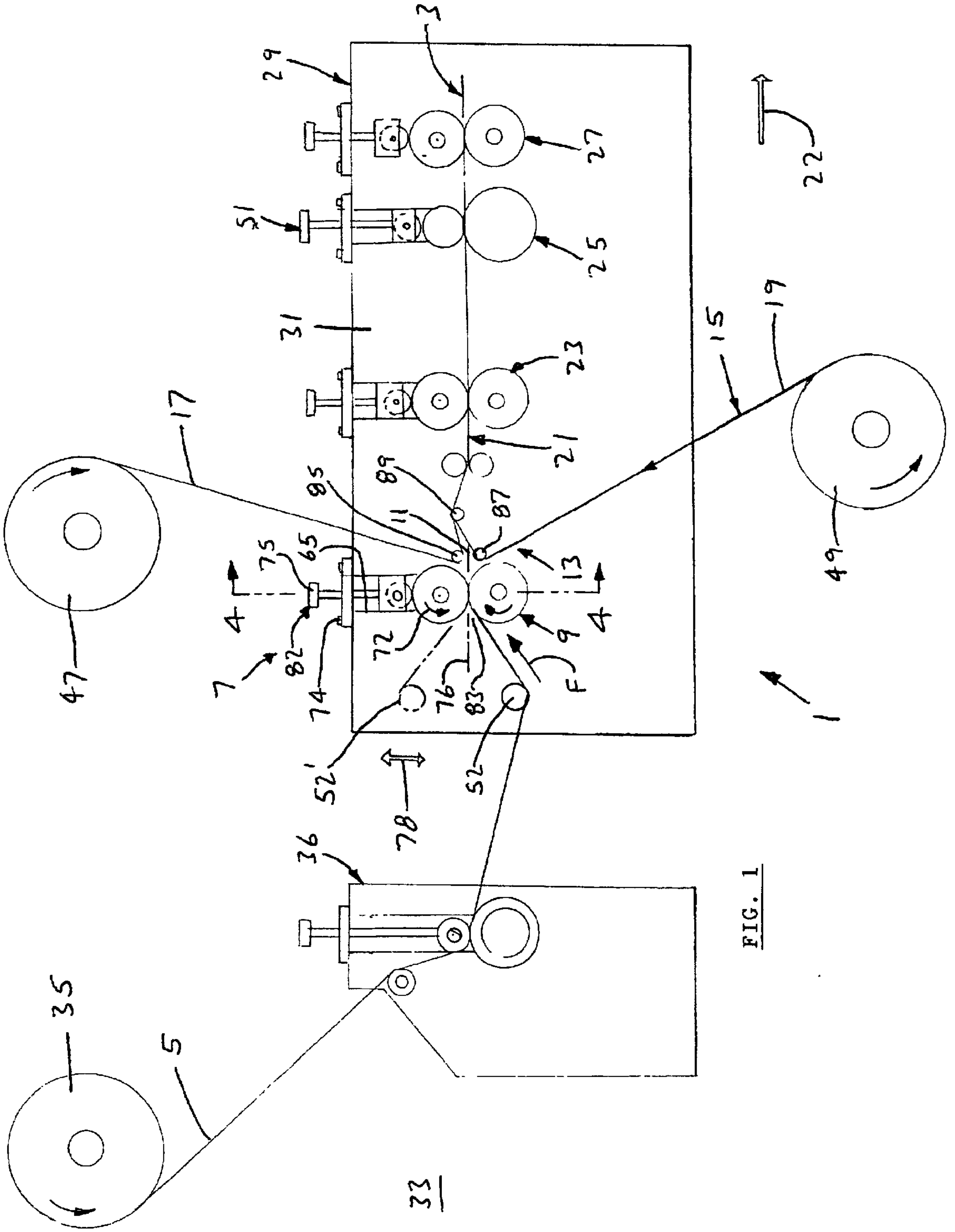
FIG. 1 is a schematic diagram of a multi-web processing machine that includes the present invention.

Referring to FIGS. 1–3, a multi-web processing machine 1 is illustrated that includes the present invention. The multi-web processing machine 1 is particularly useful for manufacturing products 3 from three different flexible components on a continuous basis. However, it will be understood that the invention is not limited to processing three-component products.

To manufacture the products 3 on the multi-web processing machine 1, an infeed web 5 is drawn to a slip cutting system 7. The infeed web 5 is sheeted into discrete articles 11 at a slip cutting station 9 of the slip cutting system 7. From the slip cutting station 9, the articles 11 are merged to a carrier web 15 at an insert station 13 that is part of the slip cutting system.

For the particular multi-web processing machine 1 and product 3 shown, the carrier web 15 consists of a top web 17 and a bottom web 19. A composite web 21 of the top and bottom webs 17 and 19, respectively, and the articles 11 is propelled in a downstream direction 22 by a drive station 25 to a sealing station 23. At a cutting station 27 downstream of the drive station 25, the composite web 21 is cut into the individual products.

Product

The particular product 3 to be described is merely representative of a wide variety of multi-component products that are manufacturable by means of the present invention. it will be appreciated that the particular size, shape, and materials of the product can vary widely and that the scope of the present invention is not limited to manufacturing any particular product.

The particular product 3 shown has a flexible top sheet 28, a flexible bottom sheet 30, and a flexible middle pad 32. The thickness of the sheets 28 and 30 and of the pad 32 need not be equal, nor need they be made from the same material. The top and bottom sheets, as well as the pad, can be any shape. As illustrated, the product is rectangular in shape. The product has a leading edge 34, a trailing edge 37, and opposite side edges 39. The pad has a leading edge 41, a trailing edge 43, and side edges 45. It is a feature of the present invention that the pad leading edge 41 is spaced from the product leading edge 34 by a distance X. Further, the pad trailing edge 43 is spaced from the product trailing edge 37 by a distance X1, and the pad side edges 45 are spaced from the associated product side edge edges 39 by a distance X2. The distances X, X1, and X2 may be, but are not necessarily, equal. The top and bottom sheets are sealed to each other along the margins of their respective leading, trailing, and side edges, as is represented by the lines 93. Thus, the pad is centered in and is captured between the top and bottom sheets.

Multi-Web Processing Machine

In the particular construction illustrated, the multi-web processing machine 1 comprises a frame 29 having transversely spaced upright side plates 31. At an upstream end 33 of the machine is a supply roll 35 of the infeed web 5. As will be explained in detail shortly, the infeed web 5 is used to make the pads 32 of the products 3. Between the infeed web supply roll 35 and the slip cutting system 7 is a drag station

36, through which the infeed web 5 passes in the downstream direction 22. The drag station 36 imparts a controlled drag force on the infeed web. Consequently, to draw the infeed web to the slip cutting system, a force represented by arrow F must be exerted on the infeed web downstream of the drag station.

The machine 1 supports a supply roll 47 of the top web 17 and another supply roll 49 of the bottom web 19. The drive station 25 pulls the top and bottom webs from the supply rolls 47 and 49, respectively, at a constant and equal speed. The top and bottom webs are wider than the infeed web 5 by an amount equal to twice the distance X2 of FIG. 2. The infeed web is centered transversely between the web side edges. The drive station includes a force mechanism 51 that is adjustable to suit the particular top and bottom web materials.

Between the slip cutting system 7 and the drive station 25 is the sealing station 23. At the sealing station, the top and bottom webs 17 and 19, respectively, are sealed to each other along the lines 93. At the cutting station 27, the sealed top and bottom webs are cut into the individual products 3 in a manner that produces the distance X between the pad leading edge 41 and the product leading edge 34, and the distance X1 between the pad trailing edge 43 and the product trailing edge 37.

As described, the machine 1 processes a single top web 17, bottom web 19, and infeed web 5. However, the present invention is equally useful for processing two or more carrier webs and/or infeed webs. For example, two or more sets of top, bottom, and infeed webs can be spaced side-by-side transverse to the downstream direction 22. Alternately, single wide top and bottom webs can be used with multiple transversely spaced narrow infeed webs.

Slip Cutting Station

Also looking at FIG. 4, the infeed web 5 is sheeted into the discrete articles 11 at the slip cutting station 9 of the slip cutting system 7. For that purpose, the slip cutting station comprises a cutting die 53, an anvil roller 55, and a force mechanism 57. The anvil roller 55 is mounted in the side plates 31 of the machine 1 for rotating about a fixed longitudinal axis 59.

The cutting die 53 defines a longitudinal axis 61. The cutting die is journaled for rotation in die blocks 63. The die blocks 63 are slidably retained in respective slots 65 in the machine side plates 31. Thus, the center distance between the anvil roller longitudinal axis 59 and the cutting die longitudinal axis 61 is variable. The cutting die has a cylindrical rail 66 at each end close to the die blocks 63 and a cylindrical central portion 68 between the rails. The central portion 68 has a peripheral surface 80 with an outer diameter that is less than the outer diameter of the rails 66. The cutting die rails contact the outer diameter of the anvil roller 55. There is thus a clearance 70 between the cutting die central portion peripheral surface 80 and the anvil roller. The cutting die central portion 68 and the anvil roller combine to form a nip 83 that defines a nip plane 76. In the particular machine 1 illustrated, the nip plane 76 is horizontal and generally parallel to the downstream direction 22. The cutting die and anvil roller are powered by a drive train, not shown, to continuously rotate in unison at a constant speed in the directions of arrows 72. The surface speed of the cutting die rails and the anvil roller outer diameter is substantially equal to the speed of the webs 17 and 19 as the webs are pulled by the drive station 25.

The slip cutting system 7 further comprises a force mechanism 82, which may be generally similar to the force mechanism 51 at the drive station 25. According to one aspect of the invention, the force mechanism 82 comprises a bearing bar 67 that is rotatably supported in bearing blocks 69. The bearing blocks 69 are retained for sliding in the slots 65 in the machine side plates 31. The bearing bar 67 holds a bearing 71 close to each bearing block. The bearings 71 contact the cutting die rails 66.

A pressure plate 73 is fixed by fasteners 74 to the machine side plates 31 above the end of each slot 65. A long screw 75 is threaded through each pressure plate 73. The ends of the screws 75 bear against the associated bearing blocks 69. Thus, turning the screws causes a linear force to be applied between the cutting die rails and the anvil roller 55.

It will be noticed in FIG. 1 that the infeed web 5 passes around an infeed bar 52 between the drag station 36 and the slip cutting station 9. The infeed bar 52 is part of the slip cutting system 7. The infeed bar is moveable in directions illustrated by arrows 78 generally perpendicular to the downstream direction 22. As shown, the infeed bar is positioned such that the infeed web contacts the anvil roller 55 before the infeed web reaches the nip 83. Depending upon the particular infeed web and top and bottom webs 17 and 19, respectively, that are used, the infeed bar position can be varied such that the infeed web contacts the cutting die 53 before the infeed web reaches the nip, as is shown by phantom line 52'. In some situations, it may be desirable that the infeed web coincide with the nip plane 76 as the infeed web reaches the nip. The infeed bar can be positioned to achieve that purpose also.

The slip cutting station 9 performs two functions: it draws the infeed web 5 from the supply roll 35, and it sheets the infeed web into the discrete articles 11. To achieve those functions, and looking at FIGS. 6A–6D, the cutting die 53 is provided with one or more knife blades 77 and a packing 79 associated with each knife blade. As illustrated, there are four knife blades 77A–77D and four packings 79A–79D. However, more or fewer knife blades and packings can be incorporated into the cutting die, depending on the requirements to manufacture the particular product 3. Each knife blade 77A–77D extends longitudinally between the cutting die rails 66. The height of the knife blades is slightly less than the height of the clearance 70 between the cutting die peripheral surface 80 and the anvil roller 55, FIG. 4.

Each packing 79A–79D has a height that is only a part of the clearance 70 between the cutting die peripheral surface 80 and the anvil roller 55. The specific height of each packing is dependent upon the particular infeed web 5. The packing material is also dependent on the particular infeed web material. The combination of the packing height and material is chosen to suit not only the particular infeed web but also the drag force imparted to the infeed web by the drag station 36.

It will be noticed that the packings 79A–79D do not cover the full circumferential distance between consecutive knife blades 77A–77D. Rather, the knife blades and packings are arranged such that each packing has a leading edge and a trailing edge. For rotation of the cutting die 53 and the anvil roller 55 in the directions of the arrows 72, the packing 79A, for example, has a leading edge 79AL and a trailing edge 79AT. As illustrated, the leading edge of each packing is adjacent a knife blade. Between the trailing edge of each packing 79A–79D and the next consecutive knife blade is a circumferential space 81. For example, there is a circumferential space 81A between the trailing edge 79AT of the packing 79A and the knife blade 77B. The circumferential length of the circumferential space 81 is selected to suit the particular product 3 that is to be manufactured using the multi-web processing machine 1.

Figures 6A, 6B, 6C, 6D:
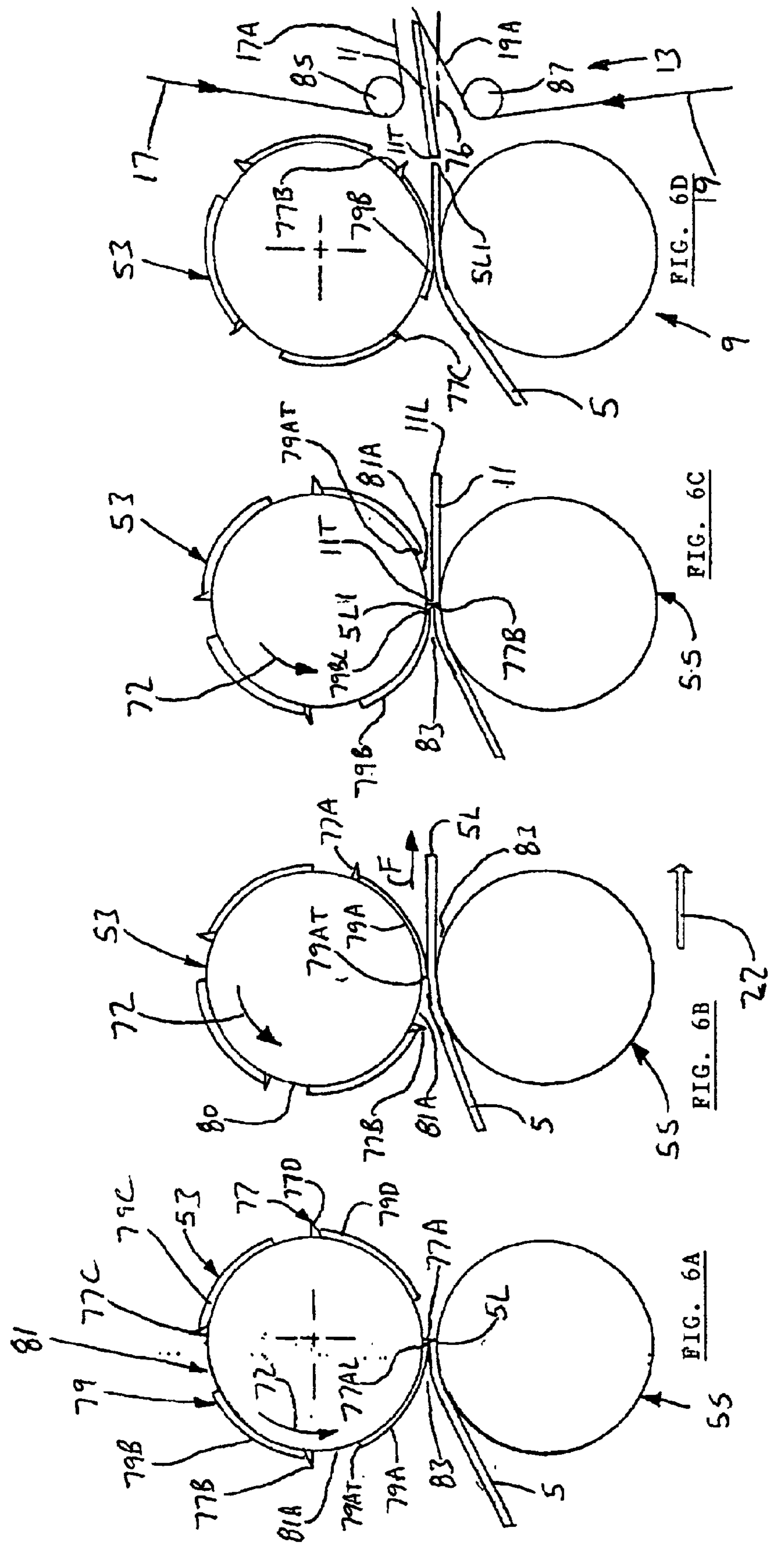
FIGS. 6A–6F are schematic diagrams showing the operation of the slip cutting system of the present invention.

With particular attention to FIG. 6A, the packings 79A–79D cooperate with the anvil roller 55 to draw the infeed web 5 from the supply roll 35 (FIG. 1). In FIG. 6A, the infeed web has a leading end 5L that is at the nip 83 between the anvil roller and the cutting die central portion 68. Specifically, the infeed web leading end 5L is between the leading edge 79AL of the packing 79A and the anvil roller. The packing material and the anvil roller produce a sufficient friction force F on the infeed web to draw it in the downstream direction 22, FIG. 6B. The infeed web leading end 5L moves downstream with the rest of the infeed web.

Downstream motion of the infeed web 5 continues until the trailing edge 79AT of the packing 79A is at the nip 83 with the anvil roller 55. Further rotation of the cutting die 53 and the anvil roller in the directions of arrows 72 brings the cutting die circumferential space 81A to the nip. With the packing 79A no longer at the nip, there is no longer any friction force F exerted on the infeed web. A small amount of friction force may be produced between the cutting die peripheral surface 80 at the clearance 81A and the anvil roller. However, that small amount of friction force is not sufficient to overcome the drag force imparted on the infeed web by the drag station 36. Consequently, the infeed web halts moving in the downstream direction 22. The infeed web, including its leading end 5L, thus remains stationary even though the cutting die and anvil roller continue to rotate.

In FIG. 6C, the cutting die 53 and anvil roller 55 have rotated through the circumferential space 81A, but the infeed web leading end 5L has not moved since the packing trailing edge 79AT passed the nip 83. The rotation of the cutting die has brought the knife blade 77B to the nip. The knife blade 77B sheets the infeed web to make a discrete article 11 having a leading edge 11L and a trailing edge 11T. Almost instantaneously, the leading edge 79BL of the next consecutive packing 79B is at the nip. The packing 79B cooperates with the anvil roller to produce a new friction force F on the new infeed web leading end 5L1. Simultaneously, the knife blade 77B pushes the article trailing edge 11T in the downstream direction 22. The cycle thus repeats for drawing the infeed web in intermittent fashion through and sheeting it at the nip.

The design of the force mechanism 82 renders the slip cutting system 7 exceptionally versatile. Different materials for the infeed web 5, as well as different thicknesses of the same material, may require different clearances 70, knife blades 77A–77D, and/or packings 79A–79D. Different cutting dies with the requisite clearances, knife blades, and packings are easily interchangeable by removing the pressure plates 73 and the bearing blocks 69 with the bearing bar 67 from the machine side walls 31. The die blocks 63 of the previously used cutting die are then removed from the machine frame 29. A new cutting die is journaled in the die blocks and reassembled to the frame. In that manner, cutting die changeover from one infeed web to another is quickly and easily accomplished without affecting the anvil roller 55, bearing bar, or bearing blocks.

Insert Station

Figure 6F:
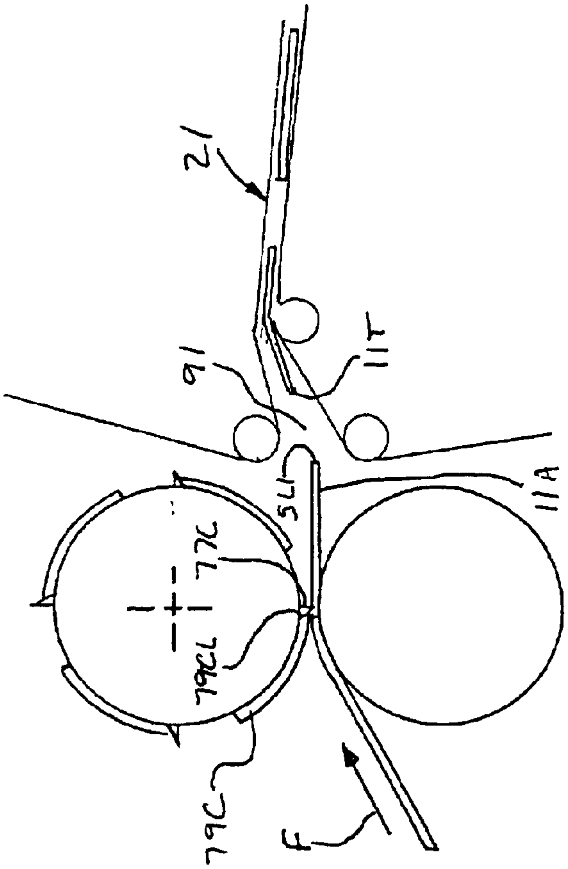
Figure 6E:
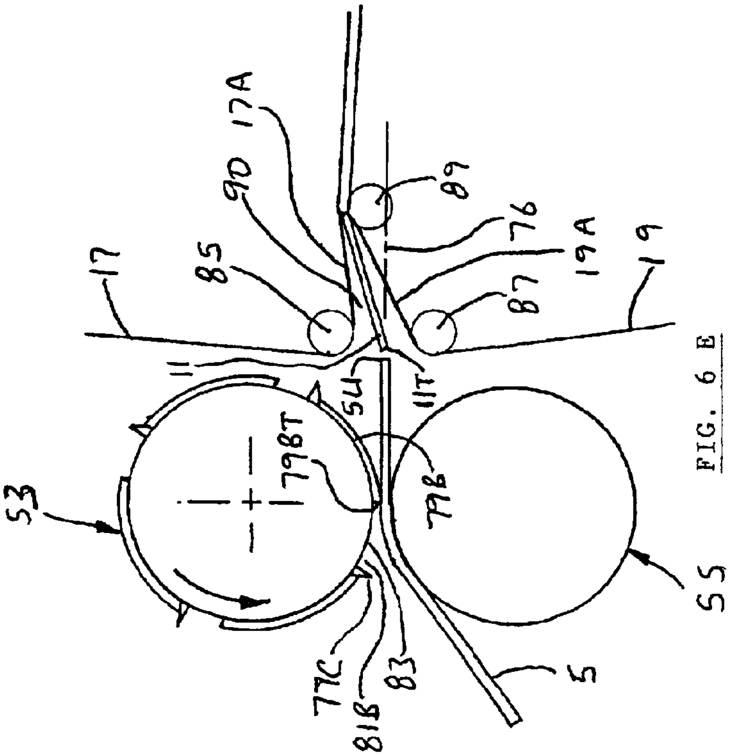

With particular attention to FIGS. 6D–6F, the article 11 sheeted from the infeed web 5 at the slip cutting station 9 is inserted between and captured between the webs 17 and 19 at the insert station 13. In the preferred embodiment, the insert station is comprised of three guide rods 85, 87, and 89. The guide rods 85, 87, and 89 each have opposite ends received in the machine side plates 31. The first guide rod 85 is located downstream of the cutting die 53 and above the nip plane 76. The second guide rod 87 is under the first guide rod and is below the nip plane. The third guide rod 89 is downstream of the first and second guide rods. The top edge of the third guide rod is on the same side of the nip plane as the first guide rod.

The top web 17 passes around the first guide rod 85 between the supply roll 47 and the sealing station 23 (FIG. 1). The bottom web 19 passes around the second guide rod 87 between the supply roll 49 and the sealing station. The bottom web is between the third guide rod 89 and the top web. As a result of the relative placements of the three guide rods, a triangular space 90 is present in the downstream direction of the nip 83, with the apex of the triangular space being at the third guide rod. The angle made by the bottom web relative to the nip plane 76 at section 19A between the second and third guide rods is steeper than the angle made by the top web at section 17A between the first and third guide rods. As mentioned, the speed of the top and bottom webs are equal to each other, and are also equal to the surface speed of the cutting die 53.

As explained with respect to FIG. 6C, the continuous rotation of the cutting die 53 causes the knife blade 77B to push the sheeted article 11 in the downstream direction 22 immediately after sheeting the infeed web 5. That action, combined with the fact that the article leading edge 11L is unsupported, causes the article leading edge to fall by gravity onto the bottom web 19 at section 19A. The moving bottom web carries the article leading edge toward the third guide rod 89. There the article is captured between the bottom web and the top web 17. For clarity, FIGS. 6E and 6F show the top and bottom webs as being separated from the article; however, in actuality the top and bottom webs are in flat facing contact with the article. Friction between the two webs and the article is sufficient to propel the article downstream with the webs as the composite web 21.

Because the speed of the webs 17 and 19 is the same as the surface speed of the cutting die 53, the new leading end 5L1 of the infeed web 5 is very close to the trailing edge 11T of the sheeted article 11, FIGS. 6D and 6E, while the packing 79B is in contact with the infeed web. However, when the trailing edge 79BT of the packing 79B reaches the nip 83, the downstream motion of the infeed web halts. The infeed web remains stationary while the cutting die continues to rotate through the circumferential space 81B. Thus, the new infeed web leading end 5L1 remains stationary as the cutting die rotates. Meanwhile, however, the webs 17 and 19 continue to propel the previously sheeted article 11 between them in the downstream direction 22 at a continuous speed. Consequently, a gap 91 is created between the new infeed web leading end 5L1 and the trailing edge 11T of the previously sheeted article. When the cutting die has rotated through the circumferential space 81B, the next knife blade 77C sheets the infeed web, FIG. 6F, to make a next subsequent article 11A. The leading edge 79CL of the next packing 79C reestablishes the friction force F on the infeed web, and the cycle is complete.

The composite web 21 is shown in FIG. 5, which shows the continuous top and bottom webs 17 and 19, respectively, and the spaced articles 11 and 11A captured between the webs. FIG. 5 shows the gap 91 between the trailing edge 11T of the article 11 and the leading edge 11AL of the next subsequent article 11A.

Sealing Station, Drive Station, and Cutting Station

The composite web 21 is propelled from the slip cutting system 7 to the sealing station 23. To suit composite webs made of different materials, the force mechanism 51 at the drive station 25 is adjustable or changeable in the same manner as the force mechanism 82 at the slip cutting system 7 described previously. At the sealing station, the top and bottom webs 17 and 19, respectively, are sealed to each other around the captured articles 11 and 11A as represented by the lines 93. After passing through the drive station 25, the composite web reaches the cutting station 27. There, the composite web is cut transversely along lines 95. Each line 95 is in the middle of the gap 91 between the trailing edge 11T of a first article 11 and the leading edge 11AL of the next subsequent article 11A. The result is the product 3.

Referring again to FIGS. 2 and 3, it will be recognized that the product top sheet 28 is made from the top web 17, the product bottom sheet 30 is made from the bottom web 19, and the product pad 32 is the article 11. Moreover, the distances X are equal to one-half of the gaps 91 between consecutive articles in the composite web 21. It will also be recognized that the trailing edge 11T of the article 11 is the trailing edge 43 of the product pad 32, and the leading edge 11L of the article 11 is the leading edge 41 of the product 3.

Modified Embodiment

In FIGS. 6A–6F, the leading edges of the packings 79A–79D are adjacent the associated knife blades 77A–77D. Moreover, the trailing edge of each packing is spaced from the next consecutive knife blade by a circumferential space 81. Turning to FIGS. 7A–7D, a modified slip cutting station 96 has a cutting die 97 and an anvil roller 55'. The cutting die 97 has four knife blades 98A–98D. As is the case of the cutting die 53, the cutting die 97 may have more or fewer than four knife blades, depending on the requirements at hand. The cutting die 97 also has packings 99A–99D. The trailing edge of each packing is adjacent a knife blade. The leading edge of each packing is spaced by a circumferential space 101 from the preceding consecutive knife blade. The knife blades and packings, and the sizes of the circumferential spaces 101, are designed as described previously in connection with FIGS. 6A–6F.

Figure 7D:
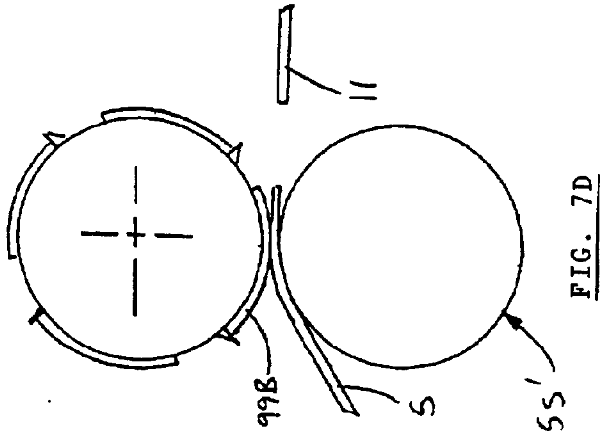
FIGS. 7A–7D are schematic diagrams generally similar to FIGS. 6A–6D, respectively, but showing a modified embodiment of the invention.
Figure 7C:
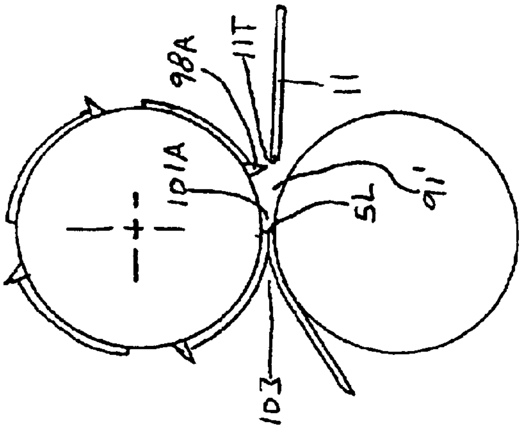
Figure 7B:
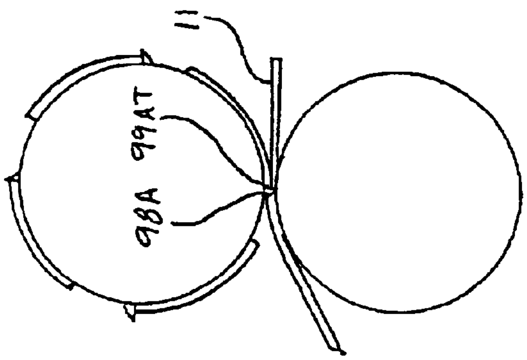
Figure 7A:
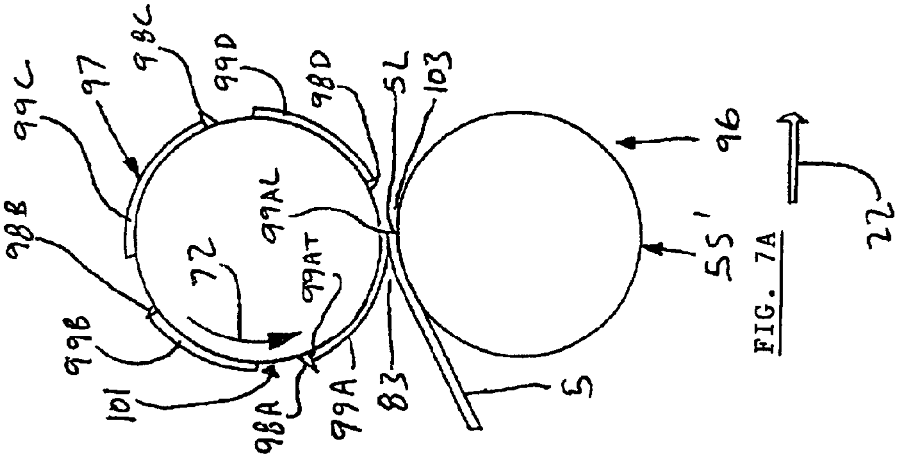

The operation of the slip cutting station 96 is similar to the operation of the slip cutting station 9 described previously. In FIG. 7A, the leading edge 99AL of the packing 99A is at the nip 103 with the anvil roller 55'. The leading end 5L of the infeed web 5 is also at the nip 103. Rotation of the cutting die 97 in the direction of arrow 72 draws the infeed web in the downstream direction 22 because of the friction force F produced by the packing 99A on the infeed web. When the packing trailing edge 99AT reaches the nip, the knife blade 98A sheets the infeed web to produce the article 11. The knife blade 98A, in conjunction with the top and bottom webs (not illustrated in FIGS. 7A–7D) push the article 11 in the downstream direction, FIG. 7B.

While the circumferential space 101A adjacent the knife blade 98A is at the nip 103, the infeed web 5 is not drawn through the nip. Consequently, a gap 91' is created between the trailing edge 11T of the sheeted article 11 and the new leading end 5L of the infeed web. The cycle continues as described previously, with the infeed web being drawn intermittently from the supply roll 35 to the slip cutting station 96.

In summary, the results and advantages of flexible composite products can now be more fully realized. The slip cutting system provides both the ability to sheet the infeed web 5 into discrete articles 11 as well as to insert the articles in longitudinally spaced relation between the continuously moving top and bottom webs 17 and 19, respectively. This desirable result comes from using the combined functions of the slip cutting station and the insert station 13. The cutting die at the slip cutting station rotates at a continuous speed. The friction force F between the infeed web and the packings draws the infeed web intermittently through the nip with the anvil roller. The knife blades sheet the infeed web into the discrete articles 11. The friction force disappears when the circumferential spaces between the cutting die knife blades and packings are at the nip, thereby halting the infeed web movement in the downstream direction 22. That action causes the sheeted articles to enter the insert station with longitudinal gaps 91 between consecutive articles. At the insert station, the longitudinally spaced articles are captured between the top and bottom webs. The composite web 21 is propelled in the downstream direction for sealing and cutting.

It will also be recognized that in addition to the superior performance of the slip cutting system 7, its construction is such as to be very versatile in the materials it can handle. For example, several infeed webs 5 can be placed in transverse side-by-side relation and simultaneously sheeted and captured between wide top and bottom webs 17 and 19, respectively. In that case the sealed composite web 21 is cut longitudinally as well as transversely at the cutting station 27 to simultaneously complete manufacture of as many products 3 as there are infeed webs.

Thus, it is apparent that there has been provided, in accordance with the invention, a slip cutting system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A slip cutting system comprising:

a. a slip cutting station comprising:

i. an anvil roller that rotates at a continuous speed; and ii. a generally cylindrical cutting die that rotates at the continuous speed and has a peripheral surface, at least one knife blade on the peripheral surface, and at least one packing having a circumferential surface with a leading edge and a trailing edge on the peripheral surface, a selected one of the leading edge or the trailing edge of said at least one packing being substantially coincident with said at least one knife blade such that said at least one packing circumferential surface defines a first predetermined length between the at least one knife blade and the other of the selected one of the at least one packing leading edge or trailing edge, and the other of the selected leading edge or trailing edge of said at least one packing being spaced from said at least knife blade to cooperate therewith to define at least one circumferential space on the peripheral surface, the at least one packing cooperating with the anvil roller to form a nip that defines a nip plane, the at least one packing and the anvil roller cooperating to be the sole means for intermittently drawing an infeed web in a downstream direction through the nip against a predetermined drag force, the infeed web being drawn in the downstream direction only when the at least one packing is proximate the anvil roller, the infeed web halting all downstream motion when the at least one circumferential space is proximate the anvil roller, the at least one knife blade cooperating with the anvil roller to sheet the infeed web into consecutive discrete articles each having a length substantially equal to the first predetermined length when the at least one knife blade is proximate the anvil roller; and b. an insert station that cooperates with the slip cutting station to merge the discrete articles to a carrier web.

2. The slip cutting system of claim 1 wherein the cutting die cooperates with the anvil roller to draw the infeed web in the downstream direction against the predetermined drag force only when said at least one packing is at the nip, and wherein all downstream motion of the infeed web is halted when said at least one circumferential space is at the nip.

3. The slip cutting system of claim 2 wherein:

a. the carrier web comprises continuously moving top and bottom webs;

b. a first sheeted discrete article is captured between the top and bottom webs at the insert station for being propelled in the downstream direction thereby simultaneously while said at least one cutting die circumferential space is at the nip and the infeed web has halted downstream motion at the slip cutting station to thereby create a gap between the first article and a leading end of the infeed web at the slip cutting station; and c. the slip cutting station again draws the infeed web in the downstream direction when said at least one packing is again at the nip to maintain the gap between the first article and the infeed web leading end at a predetermined distance as the first article is propelled in the downstream direction between the top and bottom webs and the infeed web is again drawn through the nip.

4. The slip cutting system of claim 1 wherein:

a. the leading edge of said at least one packing is substantially coincident with said at least one knife blade; and b. the trailing edge of said at least one packing is spaced from said at least one knife blade, so that the trailing edge of said at least one packing cooperates with one said at least knife blade to define said at least one circumferential space.

5. The slip cutting system of claim 1 wherein:

a. the leading edge of said at least one packing is spaced from said at least one knife blade and cooperates therewith to define said at least one circumferential space; and b. the trailing edge of said at least one packing is substantially coincident with said at least one knife blade.

6. The slip cutting system of claim 1 wherein:

a. there are a plurality of knife blades arranged consecutively around the cutting die peripheral surface; and b. there are a plurality of packings on the cutting die peripheral surface each in operative association with a respective knife blade, each packing having a leading edge substantially coincident with a respective knife blade, and a trailing edge spaced from the next consecutive knife blade and cooperating therewith to define a circumferential space, so that there is a circumferential space between the trailing edge of each packing and the next consecutive knife blade.

7. The slip cutting system of claim 1 wherein:

a. there are a plurality of knife blades arranged consecutively around the cutting die peripheral surface; and b. there are a plurality of packings on the cutting die peripheral surface each in operative association with a respective knife blade, each packing having a leading edge spaced from a respective knife blade and cooperating therewith to define a circumferential space, each packing having a trailing edge substantially coincident with the next consecutive knife blade.

8. The slip cutting system of claim 1 wherein:

a. the cutting die has a pair of cylindrical rails on opposite ends of the peripheral surface in rolling contact with the anvil roller and cooperating therewith to define a clearance between the cutting die peripheral surface and the anvil roller; and b. said at least one knife blade and said at least one packing are within the clearance when said at least one knife blade and said at least one packing are at the nip.

9. The slip cutting system of claim 8 wherein:

a. the center distance between the cutting die and the anvil roller is variable; and b. the slip cutting station further comprises a force mechanism that applies a predetermined force between the anvil roller and the cutting die.

10. The slip cutting system of claim 9 wherein the force mechanism comprises:

a. a bearing bar rotatably supported in bearing blocks;

b. a pair of bearings held on the bearing bar and in contact with the cutting die rails diametrically opposite the anvil roller; and c. means for applying a predetermined force to the bearing blocks and thereby applying the predetermined force between the bearings on the bearing bar and the cutting die rails, and thereby simultaneously applying the predetermined force between the cutting die rails and the anvil roller.

11. The slip cutting system of claim 1 further comprising means for applying a predetermined force between the anvil roller and the cutting die.

12. The slip cutting system of claim 1 further comprising an infeed bar in an upstream direction from the nip, the infeed bar being selectively positionable in directions generally perpendicular to the nip plane to guide the infeed web into the nip at a selected angle relative to the nip plane.

13. The slip cutting system of claim 1 wherein:

a. the insert station comprises:

i. a first guide rod in the downstream direction of the cutting die and on a first side of the nip plane;

ii. a second guide rod in the downstream direction of the anvil roller and on a second side of the nip plane;

iii. a third guide rod in the downstream direction of the first and second guide rods;

b. the carrier web comprises:

i. a continuously moving top web that is guided around the first and third guide rods; and ii. a continuously moving bottom web that is guided around the second and third guide rods and that cooperates with the top web to define a triangular shaped space having an apex at the third guide rod; and c. the discrete articles enter the triangular shaped space and are captured between the top and bottom webs for being propelled therewith in the downstream direction.

14. The slip cutting system of claim 13 wherein:

a. the nip plane is generally horizontal;

b. the first and second guide rods are substantially vertically aligned; and c. the third guide rod has a top edge that is above the nip plane, so that the bottom web makes an angle between the second and third guide rods relative to the nip plane that is steeper than an angle made by the top web between the first and third guide rods relative to the nip plane.

* * * * *